United States Patent [19]
Ma

[11] Patent Number: 5,791,302
[45] Date of Patent: Aug. 11, 1998

[54] ENGINE WITH VARIABLE COMPRESSION RATIO

[75] Inventor: Thomas Tsoi-Hei Ma, Essex, United Kingdom

[73] Assignee: Ford Global Technologies, Inc., Dearborn, Mich.

[21] Appl. No.: 727,566

[22] PCT Filed: Mar. 6, 1995

[86] PCT No.: PCT/GB95/00473

§ 371 Date: Oct. 23, 1996

§ 102(e) Date: Oct. 23, 1996

[87] PCT Pub. No.: WO95/29329

PCT Pub. Date: Nov. 2, 1995

[30] Foreign Application Priority Data

Apr. 23, 1994 [GB] United Kingdom ............... 9408373
Aug. 11, 1994 [GB] United Kingdom ............... 9416227

[51] Int. Cl.⁶ ...................................................... F16C 9/04
[52] U.S. Cl. ...................................................... 123/48 B
[58] Field of Search ............................. 123/48 B, 78 E, 123/197.3

[56] References Cited

U.S. PATENT DOCUMENTS

| | | | |
|---|---|---|---|
| 3,861,239 | 1/1975 | McWhorter | 123/48 B |
| 4,215,660 | 8/1980 | Finley | 123/48 B |
| 4,517,931 | 5/1985 | Nelson | 123/48 B |
| 4,957,069 | 9/1990 | Mederer | 123/48 B |
| 5,595,146 | 1/1997 | Bollig et al. | 123/48 B |

FOREIGN PATENT DOCUMENTS 809912  3/1937  France.

*Primary Examiner*—Marguerite McMahon
*Attorney, Agent, or Firm*—Jerome R. Drouillard

[57] ABSTRACT

A variable compression ratio internal combustion engine has a piston connected to a crank pin on the crankshaft by means of a connecting rod formed in two parts, with the first part being rotatably secured to the crankshaft, and the second part being rotatably secured to a gudgeon pin of the piston. The two parts are connected to each other by a coupling including two eccentrics having axes of eccentricity that are inclined to one another so that the eccentrics cannot both lie in a dead center position at the same time.

3 Claims, 1 Drawing Sheet

5,791,302

1

ENGINE WITH VARIABLE COMPRESSION RATIO

FIELD OF THE INVENTION

The present invention relates to an engine with a variable compression ratio.

BACKGROUND OF THE INVENTION

It is known to vary the compression ratio of an engine by varying the effective length of the rod connecting each piston to a crank pin on the crank shaft or by varying the height of the piston crown. One earlier proposal has been to use an eccentric sleeve interposed at the so-called small end between the gudgeon pin of the piston and the connecting rod. With the eccentric aligned at right angles to the connecting rod, the length of the rod is at its mean value and could be increased or decreased by rotating the eccentric in the appropriate direction towards the top or bottom dead centre positions, respectively.

Though the forces acting on the eccentric as a result of piston inertia and the pressures in the combustion chamber tend to move the eccentric automatically in the desired directions during each operating cycle, there is a risk that if the eccentric reaches a top or bottom dead centre position then no torque is ever developed to dislodge it from this position and the system locks up in a maximum or minimum compression ratio position. Even near these end positions, the torque may not be able to overcome the frictional forces on the eccentric.

To mitigate these problems, it was proposed in WO92/12337 to use a spring biassing the small end of the connecting rod at right angles to its length to centre the eccentric in its mean position but a very strong spring is required to be able to resist the full pressure and inertial loads on the connecting rod and for this reason the proposal did not prove practicable. Natural oscillation of the spring also risked interfering with the movements of the eccentric.

OBJECT OF THE INVENTION

The present invention therefore seeks to provide an engine that uses an eccentric to vary the effective length of the connecting rod that does not rely on springs to avoid locking up of the eccentric in dead centre positions.

SUMMARY OF THE INVENTION

According to the present invention, there is provided a variable compression ratio internal combustion engine wherein each piston is connected to a crank pin on the crankshaft by means of a connecting rod that is formed in two parts, the first part being rotatably secured to the crank and the second part being rotatably secured to a gudgeon pin of the piston, wherein the two parts are connected to one another by coupling means including two eccentrics having axes of eccentricity that are inclined to one another so that the eccentrics cannot both lie in a dead centre position at the same time.

The term "axis of eccentricity" is used to describe the line that passes through the two centres of rotation of an eccentric which may also be considered as the crank throw or the line of maximum offset.

Because the two eccentrics can never both lie in a dead centre position, one can now allow one of the eccentrics to reach the dead centre position thereby enabling direct transmission of the load while relying on the other eccentric to move the coupling out of that position and prevent locking up of the coupling when the load is reversed.

2

Preferably, the axes of eccentricity of the two eccentrics lie at right angles to one another, one being moved into its dead centre position by compression in the connecting rod and the other being moved into its dead centre position by tension in the connecting rod.

Advantageously, the part of the connecting rod rotatable about the gudgeon pin is formed of two pairs of links, each pair lying on a respective side of the connecting rod, the links in each pair each being pivoted about the gudgeon pin at one end and about a respective one of the two eccentrics at the other end, and the links in each pair being resiliently coupled to one another to permit a limited degree of movement of the eccentric towards and away from one another.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
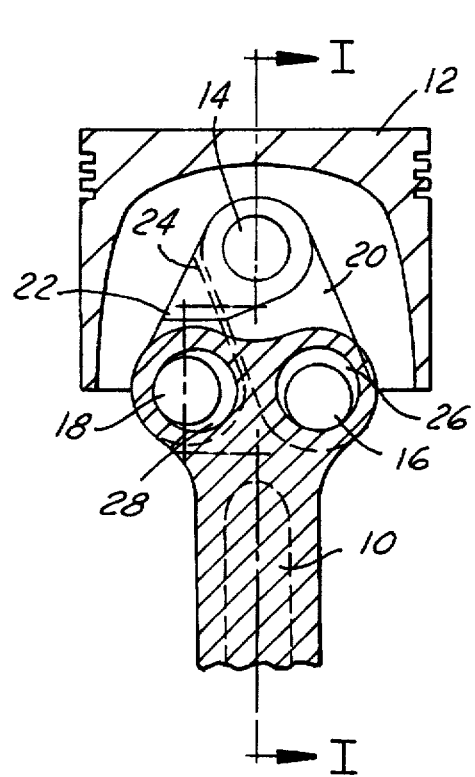
FIG. 1 is a section through a piston and part of a connecting rod assembly of an engine of the invention, the section being taken along the line II—II in FIG. 2.
Figure 2:
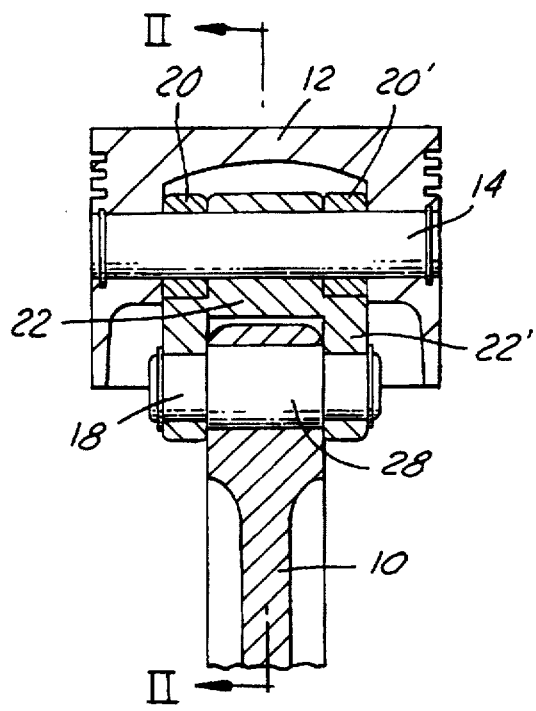
FIG. 2 is a section taken along I—I in FIG. 1.

In FIGS. 1 and 2, a piston 12 is connected to a connecting rod assembly that is formed of connecting rod 10 journalled in the usual way about a crank pin on the engine crankshaft and coupled to the gudgeon pin 14 at its upper end by means of two pairs of links 20, 22 and 20', 22' disposed symmetrically about the connecting rod 10. All four links in the two pairs pivot about the gudgeon pin 14 that is mounted in the piston 12 and is retained by circlips. The connecting rod 10 has an enlarged head within which there are rotatably received two eccentrics 26 and 28. The eccentrics 26, 28 have eccentric pins 16 and 18 at their opposite ends rotatably received in through bores in the links 20, 20' and 22, 22' respectively. Further circlips hold the links 20, 22, 20' and 22' on the eccentric pins 16 and 18.

Within each pair of links 20, 22 and 20', 22' the links may be pivoted relative to one another in the same way as the jaws of a pair of pliers, the gudgeon pin 14 acting as the pivot point. A layer of elastomeric material 24 is bonded between the facing surfaces of the links in each pair. This elastomeric material holds the two links together during assembly and in operation allows the eccentrics a limited degree of movement towards and away from one another. A small force is exerted on the links by the elastomeric material acting in the direction to separate the eccentrics and the material also serves to suppress noise.

As can be seen in FIG. 1 when the eccentric pin 16 is in its bottom dead centre position, the eccentric pin 18 lies at 90° to its top dead centre position. The eccentrics 26 and 28 automatically adopt this position when the connecting rod is in compression. This is also the position shown schematically to the left in FIG. 3. When the connecting rod is put in tension the eccentric pin 16 will not be subjected to any torque but the eccentric pin 18 will be turned clockwise to move into its top dead centre position shown to the right in FIG. 3. The eccentric pin 18 will act directly on the link 22 which in turn will push through the elastomeric material 24 onto to the link 20 and act to rotate the eccentric pin 16 out of its bottom centre position. The return to the position shown to the right in FIG. 3 will likewise occur automatically when the connecting rod is subjected to compression. During this movement, any slight tendency for the eccentric pins to move towards or away from one another is accommodated by contraction or expansion of the elastomeric material 24.

Figure 3:
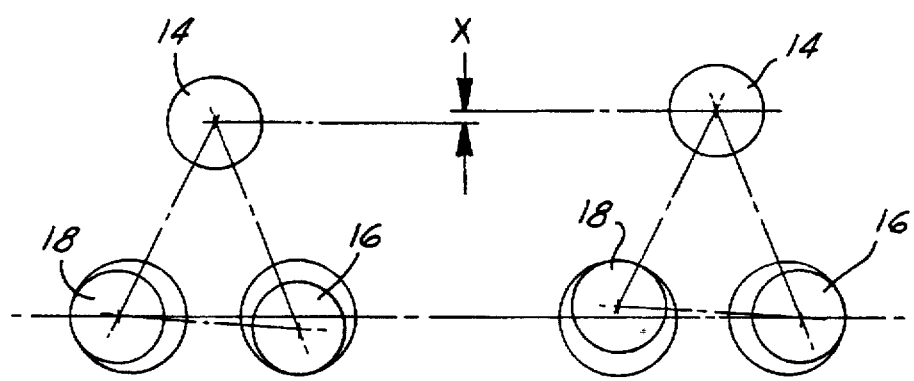
FIG. 3 is a schematic diagram to illustrated the effect of the rotation of the eccentrics on the effective length of the connecting rod.

As is clear from FIG. 3 the effect of the rotation of the two eccentrics 16, 18 is to move links 20, 22 and thereby vary the effective length of the connecting rod assembly by an amount x as the forces on the connecting rod assembly alternate between tension and compression.

In operation, at the end of the compression stroke of the engine the connecting rod 10 is held at one end by the crank pin while the inertial force on the piston acts to place the connecting rod assembly in tension. There is however opposition to this movement from the pressure within the combustion chamber and the net force on the connecting rod will vary with engine speed and load. The lost motion created by the eccentrics 16, 18 will allow the piston 12 to move to the maximum extent possible to reduce the end volume and thereby increase the compression ratio. As soon as the engine fires the combustion pressure will now act to put the connecting rod assembly in compression and immediately the piston will move freely relative to the crank pin due to the effect of the rotation of the eccentrics without transmitting any torque to the crankshaft. Once the eccentric pin 16 reaches its bottom dead centre position the compression forces are then directly transmitted to the crankshaft. The kinetic energy of the piston developed during the rotation of the eccentrics is also at this time transmitted to the crankshaft.

The effect on the combustion cycle of such movement of the piston is that compression always reaches a maximum for the speed and load conditions and expansion always takes place in two stages. The first stage occurs very rapidly which reduces the risk of abnormal combustion due to engine knock. The rapid expansion is also accompanied by immediate reduction of the gas temperature which reduces the formation of NOx. Thermal efficiency is further improved by reduced heat loss resulting from the reduction in gas temperature and the reduction of the surface to volume ratio of the combustion chamber. The second stage of the expansion is the same as that in a conventional engine with fixed compression ratio.

The inertial force on the piston will also always minimise the end volume at the end of the exhaust stroke. Because the exhaust valve is open during the exhaust stroke, there is only the exhaust back pressure opposing the inertial forces during this part of the cycle and the piston will therefore invariably reach the very top of its stroke. Likewise at the end of the intake stroke, the downward inertia of the piston will result in it reaching the very bottom of its stroke. The engine therefore has better scavenging and improved volumetric efficiency and better idling performance on account of the improved combustion stability.

It will be appreciated that the connecting rod assembly will undergo extension and contraction cyclically and that the operation described above is a dynamic one that repeats with each engine combustion cycle attempting at all times to maximise the compression ratio for the prevailing speed and load conditions.

It is known that bearings in the small end of the connecting rod can be lubricated either by splash lubrication or by forced lubrication. In the former cases, the oil spray present in the crankcase is relied upon to ensure that the lubricant reaches all the bearing surfaces and in the latter case oil from the oil pump is directed under pressure to the bearing surfaces through bores in the connecting rod and in the bearing surfaces. The engine construction described above does not preclude either method of lubrication.

I claim:

1. A variable compression ratio internal combustion engine wherein each piston is connected to a crank pin on the crankshaft by means of a connecting rod that is formed in two parts, the first part rotatably secured to the crank and the second part rotatably secured to a gudgeon pin of the piston, wherein the two parts are connected to one another by a coupling including two eccentrics having axes of eccentricity that are inclined to one another so that the eccentrics cannot both lie in a dead center position at the same time, with the axes of eccentricity of the two eccentrics lying at right angles to each other, with one eccentric being moved to its dead center position by compression in the connecting rod and the other being moved to its dead center position by tension in the connecting rod.

2. An internal combustion engine as claimed in claim 1, wherein the part (20) of the connecting rod rotatable about the gudgeon pin (14) is formed of two pairs of links, each pair lying on a respective side of the connecting rod, the links in each pair each being pivoted about the gudgeon pin (14) at one end and about a respective one of the two eccentrics (26,28) at the other end, and the links in each pair being resiliently coupled to one another to permit a limited degree of movement of the eccentric towards and away from one another.

3. An internal combustion engine as claimed in claim 2, wherein the links (20,22) in each pair are bonded to one another through the intermediary of an elastomeric material (24) that acts resiliently on the links in the direction to urge the eccentric away from one another.

* * * * *